UNITED STATES PATENT OFFICE.

EDWARD J. MALLETT, JR., OF NEW YORK, N. Y.

MANUFACTURE OF CHLORIDE OF ZINC.

SPECIFICATION forming part of Letters Patent No. 236,051, dated December 28, 1880.

Application filed May 3, 1880. (No specimens.)

*To all whom it may concern:*

Be it known that I, EDWARD J. MALLETT, Jr., of the city, county, and State of New York, have invented certain new and useful Improvements in the Manufacture of Chloride of Zinc, of which the following is a specification.

My invention is directed to the economical production of chloride of zinc—a disinfecting material which is used in carrying out the improvements comprised in my Letters Patent No. 222,519, of December 9, 1879, reissued February 10, 1880, No. 9,068, and No. 225,842, of March 23, 1880.

It has before been known that if a solution of sulphate of zinc and a salt, such as chloride of sodium, be sufficiently cooled a mutual decomposition of the two ingredients in solution will take place, resulting in the formation of chloride of zinc and sulphate of soda, or Glauber's salt. I have discovered that I can produce this decomposition by cooling the upper stratum only of the solution, the industrial value of the discovery mainly being that the process can be more rapidly conducted, inasmuch as it takes less time to cool a part of the liquid than the whole; and, secondly, it is less expensive, for the reason that less refrigerating material is required to cool the thin upper stratum of the solution than would be required if the whole solution were cooled to the same degree; and practice shows that the refrigerating effect due to the application in a solution such as specified of refrigerating means to the upper stratum is confined almost entirely to that stratum, the main body of the solution below the latter remaining practically at nearly normal temperature. I thus, instead of cooling the whole body or mass of the liquid, depend upon a cooled surface stratum as a mere excitant of crystallization, tests showing that the crystallization thus excited extends throughout the warmer body of the solution as well as the cold top stratum.

In carrying out my invention the ingredients used are sulphate of zinc and a proper salt, preferably chloride of sodium, or common salt, both of which are cheap and easily obtainable. The apparatus employed is entirely simple, consisting of a trough or vat of any desired capacity having a depth of from six inches to three feet, or even more. In the open upper portion of this vessel I place a horizontal connected series of pipes, forming a layer of metallic tubing or piping, the piping having, say, an inch or an inch and a half external diameter, and being arranged at such a height that the said layer of piping will be just about covered by the solution when the vessel is properly charged. Thus the piping will lie in the surface stratum of the liquid for a depth of about an inch or so. The connected pipes of the series are placed close together and extend practically throughout the area of the said surface stratum, and they communicate with a reservoir containing the refrigerating-liquid, (usually salt and ice water,) and with a force-pump, which drives the liquid through the piping.

The mode of procedure is as follows: I prepare a solution of sulphate of zinc and common salt, say, 58.8 parts of salt mixed with 143.3 parts of crystallized sulphate of zinc dissolved in water sufficient to bring the specific gravity to 1.25. I fill the vessel with this solution until the liquid just covers the horizontal layer of piping. I then force the refrigerating-liquid through the piping, thus bringing into and practically throughout the area of the surface stratum of the solution refrigerating-surfaces, which rapidly reduce the temperature of this stratum to a depth of, say, one and a half inch to and below 32° Fahrenheit. Mutual decomposition of the two ingredients in solution at once sets in, and the crystallization thus excited throughout the mass not being confined to the cold surface stratum, but extending to the warmer liquid below, continues until practically all of the sulphate of soda is crystallized, leaving the chloride of zinc in the mother liquor, which is then siphoned or otherwise drawn off from the vessel. From this liquor the solid chloride of zinc is obtained by the usual processes.

What I claim as my invention, and desire to secure by Letters Patent, is—

The improvement in the art of obtaining zinc chloride which consists in applying the refrigerant to the surface stratum only of a solution containing zinc sulphate and a salt, such as sodium chloride, substantially as set forth.

In testimony whereof I have hereunto set my hand this 30th day of April, A. D. 1880.

EDWARD J. MALLETT, JR.

In presence of—
BYRON A. COHEN,
JOHN BROWN.